(12) United States Patent
Adiletta

(10) Patent No.: US 12,374,233 B2
(45) Date of Patent: Jul. 29, 2025

(54) UNIVERSAL MUSICAL INSTRUMENT TRAINER

(71) Applicant: Kathryn Adiletta, Boston, MA (US)

(72) Inventor: Kathryn Adiletta, Boston, MA (US)

( * ) Notice: Subject to any disclaimer, the term of this patent is extended or adjusted under 35 U.S.C. 154(b) by 237 days.

(21) Appl. No.: 18/179,652

(22) Filed: Mar. 7, 2023

(65) Prior Publication Data

US 2024/0304104 A1 Sep. 12, 2024

(51) Int. Cl.
*G09B 15/02* (2006.01)
*G09B 5/02* (2006.01)
*G10G 1/02* (2006.01)

(52) U.S. Cl.
CPC .......... *G09B 15/023* (2013.01); *G09B 5/02* (2013.01); *G10G 1/02* (2013.01)

(58) Field of Classification Search
CPC ................ G09B 15/023; G10G 1/02
See application file for complete search history.

(56) References Cited

U.S. PATENT DOCUMENTS

| | | | | |
|---|---|---|---|---|
| 3,501,849 A * | 3/1970 | Olsen | ............ | G09B 13/04 434/233 |
| 3,744,366 A * | 7/1973 | Del Castillo | .......... | G09B 15/08 84/478 |
| 4,422,365 A * | 12/1983 | Iwaki | ................... | G10H 1/0016 84/478 |
| 4,519,781 A * | 5/1985 | Boyd | .................. | G09B 21/009 2/160 |
| 4,768,412 A * | 9/1988 | Sanderson | ............... | G10G 3/04 84/645 |
| 5,107,743 A * | 4/1992 | Decker | .................. | G09B 15/08 84/478 |
| 5,394,784 A * | 3/1995 | Pierce | .................. | G10H 1/0016 84/645 |
| 5,886,273 A * | 3/1999 | Haruyama | ............. | G09B 15/08 84/478 |
| 6,388,181 B2 * | 5/2002 | Moe | ........................ | G09B 15/08 84/478 |
| 6,407,324 B1 * | 6/2002 | Hulcher | ................. | G09B 15/08 84/478 |
| 6,915,488 B2 * | 7/2005 | Omori | .................. | G10H 1/0008 84/478 |
| 7,202,613 B2 * | 4/2007 | Morgan | ................. | H05B 47/18 315/312 |
| 7,352,339 B2 * | 4/2008 | Morgan | .................. | F24C 7/004 345/31 |

(Continued)

FOREIGN PATENT DOCUMENTS

CN 102184728 A * 9/2011
WO WO-2009128028 A1 * 10/2009 .......... G09B 15/003

*Primary Examiner* — Robert W Horn
(74) *Attorney, Agent, or Firm* — Fish & Richardson P.C.

(57) ABSTRACT

A universal musical instrument trainer is disclosed that indicates a correct musical note and time to play. The trainer has a first array of (LEDs coupled in series. A housing has a receptacle channel configured to mechanically coupled to the first array of LEDs. A controller assigns, to each one of the first plurality of LEDs, a musical note selected from a plurality of musical notes. The controller generates, at one or more predetermined frequencies, one or more pulse signals that includes information corresponding to a duration and a frequency of each pulse of light to be displayed in one or more of the first plurality of LEDs.

20 Claims, 6 Drawing Sheets

(56) References Cited

U.S. PATENT DOCUMENTS

| | | | | |
|---|---|---|---|---|
| 7,361,829 | B2* | 4/2008 | Uehara | G10G 1/02 |
| | | | | 84/746 |
| 7,501,571 | B2* | 3/2009 | Forsman | H05B 47/12 |
| | | | | 84/464 R |
| 8,445,767 | B2* | 5/2013 | Brow | A63F 13/245 |
| | | | | 84/478 |
| 8,525,011 | B2* | 9/2013 | Ihara | G09B 15/08 |
| | | | | 84/478 |
| 8,901,405 | B1* | 12/2014 | McCarthy | G09B 15/003 |
| | | | | 84/478 |
| 10,002,542 | B1* | 6/2018 | Jenkins | G10G 1/02 |
| 10,403,167 | B2* | 9/2019 | Borko | G09B 15/023 |
| 11,087,636 | B2* | 8/2021 | Liu | G10C 3/12 |
| 11,482,129 | B2* | 10/2022 | Holczer-Waroquet | |
| | | | | G09B 15/08 |
| 2006/0291212 | A1* | 12/2006 | Forsman | G10H 1/0016 |
| | | | | 362/276 |
| 2008/0127810 | A1* | 6/2008 | Egan | G09B 15/06 |
| | | | | 84/483.2 |
| 2024/0304104 | A1* | 9/2024 | Adiletta | G09B 5/02 |

\* cited by examiner

UNIVERSAL MUSICAL INSTRUMENT TRAINER

TECHNICAL FIELD

This disclosure relates to a universal musical instrument trainer that uses one or more light emitting diode (LED) arrays.

BACKGROUND

Learning a musical instrument requires dedication, practice, and often years-long commitment to learn how to read sheet music and become proficient at a single instrument. Mastery of musical instruments is often accompanied by years of formal music education and training. The cost of formal music education and instruments can be have a chilling effect on individuals attempting to learn a new instrument. In addition to learning how to read sheet music can intimidate and frustrate new students, and can turn away individuals who are learning a new instrument.

SUMMARY

Disclosed herein is a universal musical instrument trainer that uses one or more light emitting diode (LED) arrays. In some aspects, the universal musical instrument trainer has a first array of light emitting diodes (LEDs), having a first plurality of LEDs coupled in series, and at least a first terminal end. A housing is configured to extend the wiring therethrough. The housing has an receptacle channel that is configured to mechanically coupled to the first array of LEDs. A controller is electrically coupled the first array of LEDs. The controller assigns, to each one of the first plurality of LEDs in the first array of LEDs, a musical note selected from a plurality of musical notes. The controller generates, at one or more predetermined frequencies, one or more pulse signals that includes information corresponding to a duration and a frequency of each pulse of light to be displayed in one or more of the first plurality of LEDs.

In some implementations, the housing is configured to detachably mount to the surface.

In some implementations, the one or more pulse signals correspond to a musical scale or a song.

In some implementations, the housing is a cylindrical tube.

In some implementations, the plurality of LEDs are adjustable in a longitudinal direction.

In some implementations, the housing is adjustable along a longitudinal direction.

In some implementations, the controller is further configured to assign, to each of one of the first plurality of LEDs, a color associated with each musical note. The controller generates, among the one or more pulse signals, a signal corresponding to a color of a pulse of light to be displayed. The signal is generated in response to receiving a control signal from a processor.

In some implementations, the universal musical instrument trainer includes a plurality of colored rings. Each ring of the plurality of colored rings are configured to wear on a finger of a user.

In some implementations, the universal musical instrument trainer has an extension configured to extend a length of the universal musical instrument trainer. The extension has a second array LEDs that has a second plurality of LEDs coupled in series. The extension has at least a second terminal end. A coupling is disposed in the second terminal end. The coupling is configured to electrically couple the first array of LEDs to the second array of LEDs.

In some implementations, the coupling has a series of pins that includes at least one signal pin, a power pin, and a ground pin. The series of pins in the second terminal end of the extension are configured to electrically couple to a corresponding series of pins in the first terminal end of the first array of LEDs.

In some implementations, the universal musical instrument trainer recited produces a first color of the pulse of light that corresponds to each musical note for playing by a left hand of a user that is different that a second color of the pulse of light corresponding to each musical note for playing by a right hand of the user.

Aspects of the disclosure are directed to a universal musical instrument trainer for instruments with a keyboard and a first array of light emitting diodes (LEDs). The array of LEDs have a first plurality of LEDs coupled in series and at least a first terminal end. The first array of LEDs have m number of rows and n number of columns, where m and n are positive integers, and n is greater than or equal to m. Wiring is coupled to the first array of LEDs. A housing is configured to extend the wiring therethrough. The housing has a receptacle channel is configured to mechanically couples to the first array of LEDs. A controller is electrically coupled the first array of LEDs. The controller assigns, to each one of the first plurality of LEDs in the first array of LEDs, a musical note selected from a plurality of musical notes. The controller generates a signal corresponding to a color of a pulse of light to be displayed. The signal is among the one or more pulse signals. The signal is generate in response to receiving a control signal from a processor.

In some implementations, the controller is further configured to assign, to each of one of the first plurality of LEDs, a color associated with each musical note. The controller generates, among the one or more pulse signals, a signal corresponding to a color of a pulse of light to be displayed. The signal is generated in response to receiving a control signal from a processor.

In some implementations, the controller is further configured to generate, in two or more LEDs in a given row n, a simultaneous pulse each LED for a predetermined period that corresponds to a length of time for which each musical note is to be played on a musical instrument.

In some implementations, the universal musical instrument trainer includes a plurality of colored rings, each ring of the plurality of colored rings is wearable on a finger of a user.

In some implementations, the universal musical instrument trainer has an extension that is configured to extend a length of the universal musical instrument trainer. The extension has a second array of light emitting diodes (LEDs) has a second plurality of LEDs coupled in series and at least a second terminal end. The second array of LEDs has a coupling disposed in the second terminal end, the coupling is configured to electrically couple the first array of LEDs to the second array of LEDs.

In some implementations, the coupling has a series of pins that includes at least one signal pin, a power pin, and a ground pin. The series of pins in the second terminal end of the extension are configured to electrically couple to a corresponding series of pins in the first terminal end of the first array of LEDs.

In some implementations, a length of the pulse of light displayed in a given column n corresponds to a length of time at which each musical note is to be played on a musical instrument.

Some aspects of the disclosure are directed to a system that has a first array of light emitting diodes (LEDs) that have a first plurality of LEDs coupled in series and at least a first terminal end. A housing is configured to extend the wiring therethrough. The housing includes a receptacle channel that is configured to mechanically couples to the first array of LEDs. The system includes a non-transitory computer readable medium storing instructions, that when executed by one or more processing devices coupled to a universal musical trainer, cause the one or more processing devices to perform operations. The operations includes assigning, to each one of the first plurality of LEDs in the first array of LEDs, a musical note selected from a plurality of musical notes. The operations include generating, at one or more predetermined frequencies, one or more pulse signals that includes information corresponding to a duration and a frequency of each pulse of light to be displayed in one or more of the first plurality of LEDs.

In some implementations, the one or more pulse signals correspond to a musical scale or a song, and a first color of the pulse of light corresponds to each musical note for playing by a left hand of a user is different that a second color of the pulse of light corresponding to each musical note for playing by a right hand of the user. Advantageously, the universal musical trainer provides a visual training reference for musical notes in a scale or song that does not require the user to read sheet music, metronomes, or rely upon a personal instructor. In addition, the universal musical trainer is scalable, light weight, and programmable and is adaptable to many different musical instruments, including keyed and string instruments.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Disclosed herein is a universal musical instrument trainer that uses one or more light emitting diode (LED) arrays to indicate a correct note, timing, and length. This document describes a universal musical instrument training device that can be retro-fitted to regular musical instruments, and operated to provide visual guidance as to how to play particular sequences of notes on the instrument. The disclosed device utilizes an array of light emitting devices (e.g., light emitting diodes (LEDs) that can be programmed to visually indicate timing and duration at which a particular key or fret of the corresponding musical instrument is to be played. The device can be made adjustable in width such that the device is compatible with different instruments of varying widths. By being "adjustable," the LEDs can be adjusted such that each LED aligns with a key or fret of a musical instrument.

During a given musical arrangement, such as a song or musical scale, individual notes and chords are played according to predetermined instructions, often recorded in sheet music. Sheet music informs the instrument player about the timing of music (e.g., ¾ or 4/4 time), the duration of a given note (e.g., half note, quarter note), pitch, and which notes are played concurrently with other notes to form chords. New learners must also learn how to hold an instrument, sit or stand with the instrument, maintain and care for the instrument, which add to the complexity of musical education. For complex musical arrangements having multiple variations in tempo or pitch, the complexity can discourage new learners from continuing music study.

Formal music education is not always sought after or available to all music students. As such, non-formal techniques of musical training and devices are available to non-professional music learners. The universal musical instrument trainer simplifies music training by utilizing LEDs to visualize part or all of the musical instructions in sheet music.

LEDs in the universal musical instrument trainer receive instructions from a processor to illuminate and turn off in order to indicate the correct note, timing of the note, and a length of time at which the note is played. In some implementations, the LEDs of the universal musical instrument trainer indicate a next note or notes that should be played in the musical arrangement.

Advantageously, the novice and casual instrument players can visualize the correct sequence and time of notes to be played without reading sheet music. Additionally, utilizing the universal musical instrument trainer with sheet music enables the novice and casual musicians to visualize the timing and notes of the sheet music, the reinforcing the reading and understanding of sheet music.

Figure 1:
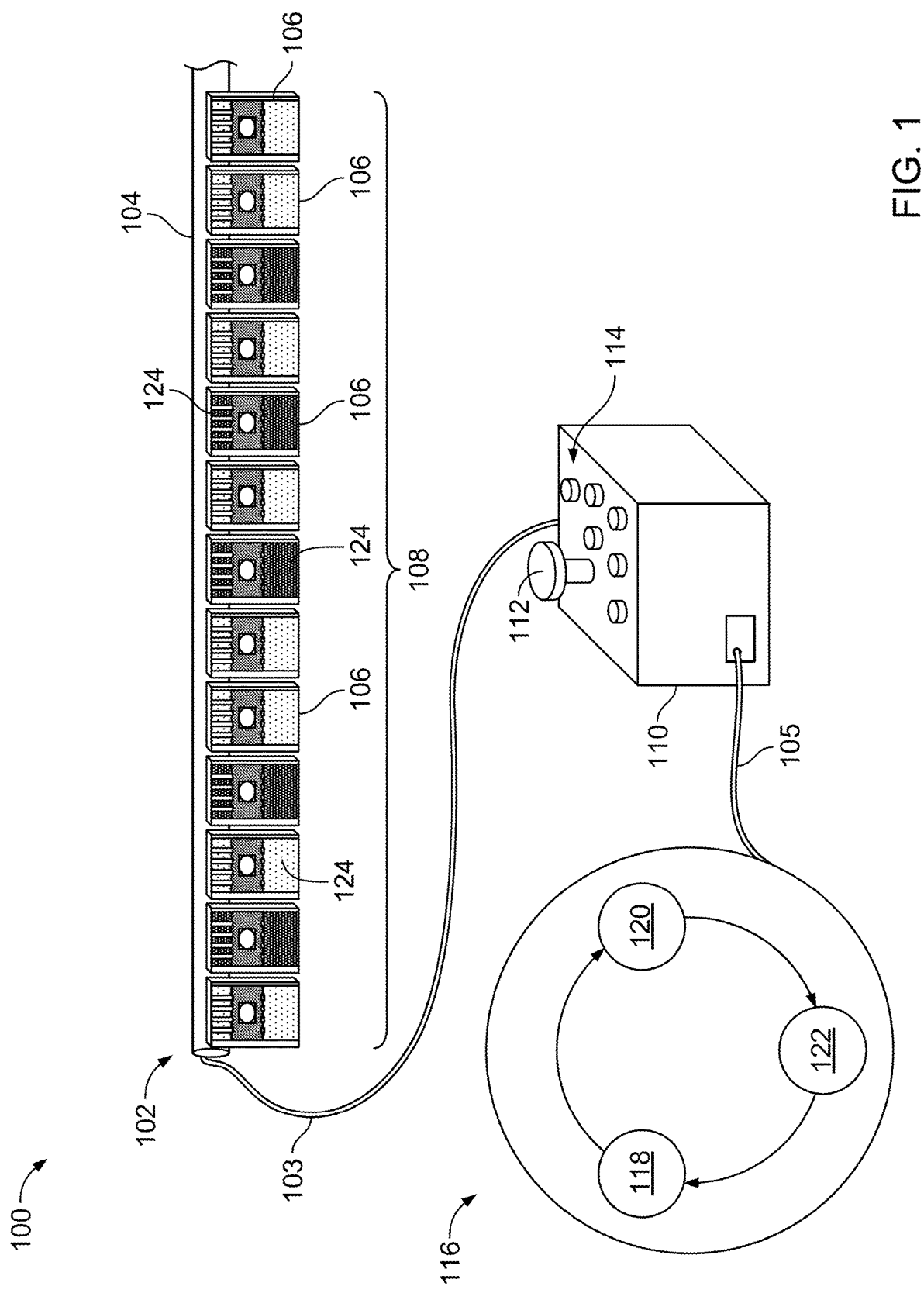
FIG. 1 is a plan view of a universal musical instrument training system, including a universal musical instrument trainer.

FIG. 1 is a plan view of a universal musical instrument training system 100, including a universal musical instrument trainer 102. The universal musical instrument trainer 102 is electrically coupled to an input panel 110 via first wiring 103. A second wiring 105 electrically couples the input panel 110 to a controller 116.

In some implementations, the controller 116 can be programmed to adjust the "tempo," or rate of play, to match the learning skills of the player. For example, the controller 116 can initiate a song or musical scale at a slow tempo. In response to feedback (e.g., error rate) from the user, the controller 116 increases the slow tempo to a faster tempo until the song or scale is played at the recommended Beats Per Minute (BPM) indicated by the song, or input by the user.

The universal musical instrument trainer 102 includes a first light emitting diode (LED) array 108. The first LED array 108 includes a plurality of individual LEDs 106. The first LED array 108 can include between about 7 LEDs 106 and about 90 LEDs 106. In one implementation, the first LED array 108 can include between about 60 LEDs 106 and about 90 LEDs 106. In other implementations, about 66, or about 72, or about 88 LEDs 106 can be disposed in the first LED array 108. Each LED 106 is coupled in series to an adjacent LED 106 to form the first LED array 108. Each LED 106 is contained in a casing 124, such that plural casings 124 are disposed within the First LED array 108. The casing 124 is made of a flexible material that enables the LEDs 106 to touch a surface of a musical instrument. In addition, the casing 124 protects wiring that couples adjacent LEDs 106 and the casing 124 provides insulation between the wiring in order to reduce cross-talk or electrical interference.

The universal musical instrument trainer 102 is mechanically coupled to a housing 104. The housing 104 extends in a same direction as the first LED array 108. A length of the housing 104 is equal to or greater than a length of the First LED array 108. In some implementations, the housing is substantially cylindrical, such as a cylindrical tube. In other implementations, the housing 104 has a substantial cuboid shape. However, it is understood by one of ordinary skill that the housing 104 can be implemented in other shapes without departing from the scope of this disclosure. As explained in greater detail below, the universal musical instrument trainer 102 is configured for musical instrument training. For example, in response to a musical notes of a predetermined musical scale or song are played for a predetermined period that corresponds to a length of time of the notes in the musical notes. The first LED array 108 sends a signal (e.g., a signal in the address) to the LED 106 that corresponds to a location of a correct musical note on a given instrument, such as a piano.

The First LED array 108 is attached to the housing 104. More specifically, the casing 124 attached to the LEDs 106 of the First LED array 108 is attached to the housing 104.

The input panel 110 is electrically coupled to the first LED array 108. The input panel 110 receives user input for increasing or decreasing a volume, or changing or selecting the song or musical scale. As such, the input panel 110 includes a volume control 112 and one or more additional controls 114. The one or more additional controls 114 can include a musical sequence restart button, practice section start and stop buttons, and a musical sequence change button for changing to a different scale or song. As noted above, the universal musical instrument trainer 102 displays the LED 106 pulses that correspond to a selected song or musical scale.

In at least one example, the input panel 110 is an Arduino Processor, which includes non-volatile memory. Data, such as preloaded tests or songs, is uploaded to the input panel 110 via the second wiring 105. The data can be loaded from a computer, or any suitable device having a memory, processor, and wirings coupled therebetween. In some implementations, the input panel 110 has an optional power source (not shown), such as a battery, thus facilitating portability of the universal musical instrument trainer 102. Alternatively, or in addition thereto, the input panel 110 can have a power/data port (not shown), such as a USB coupling, that is configured to connect and receive power from a remote power source, such as a computer.

A controller 116 is coupled to the universal musical instrument trainer 102. More precisely, the controller 116 is coupled to the universal musical instrument trainer 102 through the input panel 110. The controller 116 provides signals to input panel 110 and the universal musical instrument trainer 102. The second wiring 105 electrically couples the input panel 110 to the controller 116, transmitting signals and instructions from the controller 116 to the input panel 110. Additionally, signals and instructions are transmitted from the input panel 110 to the universal musical instrument trainer 102 via first wiring 103. The input panel 110 can also receive signals and instructions from the universal musical instrument trainer 102. Signals and instructions can also be transmitted from the input panel 110 back to the controller 116. Herein, signals may refer to data received or transmitted to the controller 116 and instructions may refer to data received and transmitted to the input panel 110. Collectively, signals and instructions may be referred to as data.

The controller 116 includes a processor 118, a memory 120, and support circuits 122 that are coupled to one another. The processor 118 may be one of any form of general purpose microprocessor, or a general purpose central processing unit (CPU), each of which can be used in an industrial setting, such as a programmable logic controller (PLC), supervisory control and data acquisition (SCADA) systems, or other suitable industrial controller. The memory 120 is non-transitory and may be one or more of readily available memory such as random access memory (RAM), read only memory (ROM), or any other form of digital storage, local or remote. The memory 120 contains instructions, that when executed by the processor 118, facilitates execution of the illumination of the first LED array 108. The instructions in the memory 120 are in the form of a program product such as a program that implements the method of the present disclosure.

One or more songs, including musical scales can be loaded into the memory 120 of the controller 116. Naturally, the song(s) and musical scales have a plurality of musical notes. The universal musical instrument trainer 102 receives one or more signals from the controller 116 that indicate which LED 106 of the first LED array 108 should emit one or more pulses. The one or more signals include information (e.g., pulse signals) corresponding to a duration and a frequency of each pulse (i.e., a pulse frequency). The pulse frequency corresponding to the frequency at which each LED should pulse, or flash, in response to receiving the pulse signals from the controller 116. The duration of the pulse illuminating the LED 106 corresponds to a period of time (t) at which a given musical note of the song or scale is played by the user. The period of time (t), and a length of time (l) of a song or musical scale are stored in the memory 120 of the controller 116. The memory 120 also stores the frequency (f) at which a musical note should be played. The song timing and musical notation (e.g., whole note, half note, quarter note, etc.) determine the frequency (f) at which the musical note is played.

As noted, the frequency of the pulse at which the LED 106 illuminates corresponds to the frequency at which the musical note should be played by the user. For example, given a quarter note of a song that is played in 4/4 time that has a bar indicated by a period(t), a single pulse of the LED 106 for ¼ of the period (t) indicates that a single quarter note should be played for a duration of ¼ of the period (t). Given a whole note that should be played for the entire period (t), the pulse at the LED 106 will illuminate for a duration lasting the entire period (t). It is understood that other musical notes (e.g., eighth note, sixteenth note, etc.) will illuminate LEDs 106 for a duration that corresponds to the type of musical note. In this manner, the universal musical instrument training system 100 creates visual cues in the form of pulse(s) of light displayed on one or more of the LEDs 106 that correspond to a musical note. In addition, the pulse(s) of displayed on one or more of the LEDs 106 indicate the tempo and frequency at which the musical note should be played.

In one implementation, the controller 116 can transmit pulses in at least two colors. The at least two colors of the LEDs 106 indicate whether a musical note should be played by a left hand or right hand of the user (not shown). One of the at least two colors is reserved for LEDs 106 of the musical notes to be played by the left hand, and the remaining color is reserved for LEDs 106 of the musical notes that should be played by the right hand. As explained above, the pulse(s) of displayed on the LEDs 106 indicate the tempo, duration, and frequency at which the musical note should be played. The controller 116 generates a given control signal corresponding to a colored pulse, in response to receiving each control signal from the processor 118. A given signal, among the one or more signals, is generated at a frequency that corresponds to the one or more predetermined frequencies of the predetermined sequence of musical notes.

The given signal includes information related to an address indicating which LED 106, in the LED array 108, the given signal should be communicated to. The given signal includes information related to a command, such as the pulse signal. The command can indicate the duration of the illumination of the addressed LED 106, the duration corresponding to the "on" signal, which is terminated by an "off" signal. In some implementations, the command indicates a given color of the illumination of the given LED 106, as explained further below.

In some implementations, the controller 116 generates a first signal (e.g., an "on" signal) in response to receiving instructions (e.g., data) from the processor 118. The given signal can be a pulse width modulated (PWM) signal for each corresponding LED 106 that indicates the duration of how long each LED 106 should be illuminated, i.e., turned "on," and/or turned "off." The given signal also indicates a corresponding color for each corresponding LED 106. For example, the given signal includes information indicating whether illumination for each corresponding LED 106 should be one of or a combination of red, green, or blue (RGB 0-255). Each illuminated LED 106 (i.e., the illuminated LED 106) that is turned "on" corresponds to a predetermined note in the sequence of musical notes or musical scale. The "on" and "off" times of the first signal and second signal correspond to the duration and tempo of the musical notes or musical scale.

The second signal (e.g., an "off" signal) can be generated before or after the first signal. However, the second signal is implemented at each respective LED 106 after the first signal is received at the respective LED 106. By way of illustration, the controller 116 generates the second signal as a pulse width modulated signal. In one implementation, the processor 118 determines the duration of the "on" and "off" times for the corresponding LED 106 of the corresponding musical note duration and the tempo. In another implementation, the input panel 110 determines the duration of the "on" and "off" times for the corresponding LED 106. In another implementation, a combination of the processor 118 and the input panel 110 determine "on" and "off" times for the musical notes or musical scale.

Figure 2:
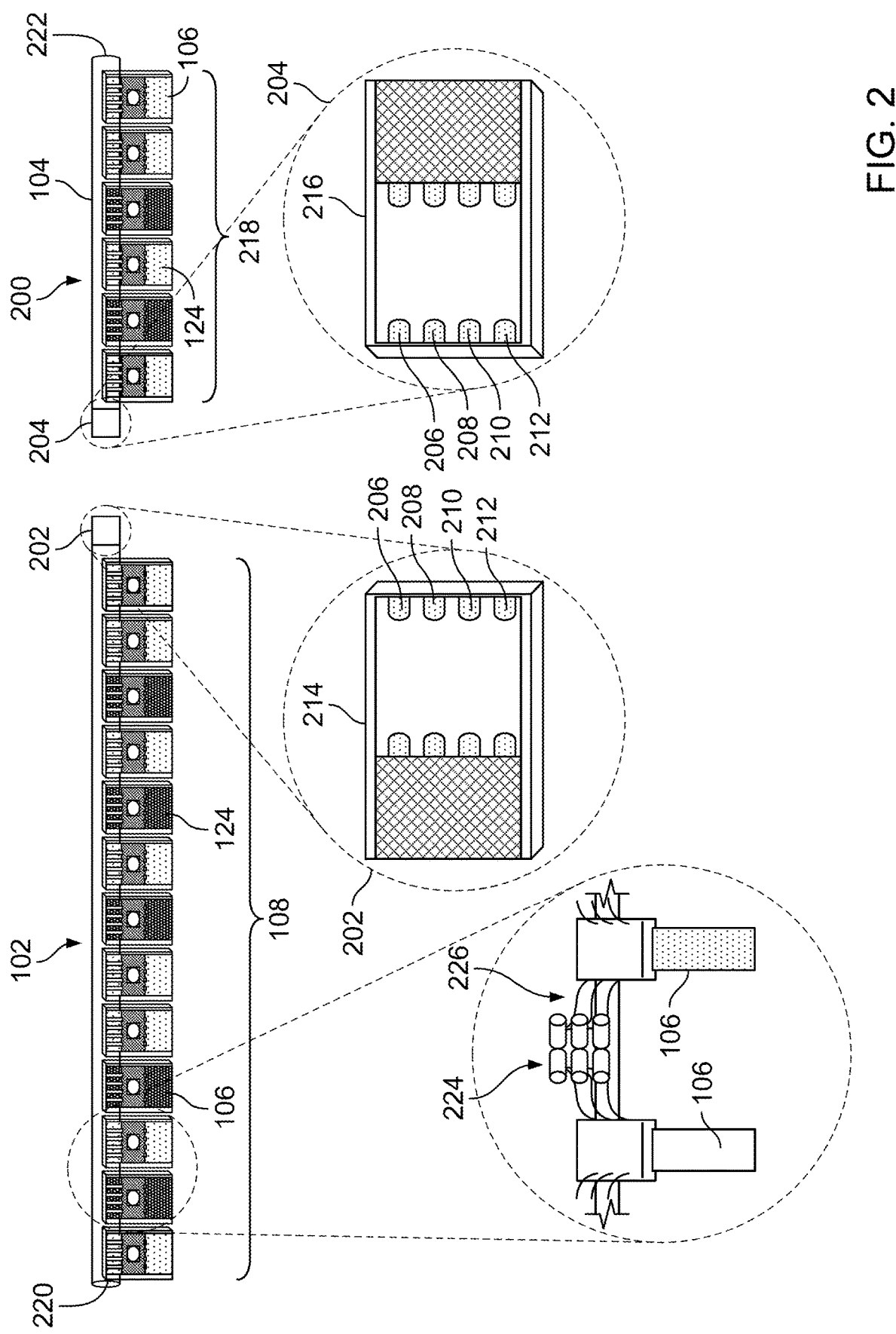
FIG. 2 is a plan view of the universal musical instrument trainer of FIG. 1 and an extension configured for extension thereto.

FIG. 2 is a plan view of the universal musical instrument trainer 102 and an extension 200 for attaching to the universal musical instrument trainer 102. The extension 200 includes a second LED array 218. The extension 200 is substantially the same as the universal musical instrument trainer 102. As such, the extension 200 includes a second LED array 218, including a plurality of LEDs 106 having casing 124, and housing 104, as explained in greater detail above. However, a length of the second LED array 218 is less than or equal to the length of the first LED array 108. For example, the second LED array 218 can include between about 5 LEDs 106 and about 25 LEDs, such as about 6 LEDs 106 or about 22 LEDs 106.

A first coupling 214 is disposed at a first terminal end 202 of the universal musical instrument trainer 102. The first terminal end 202 is opposite a second terminal end 220. The second terminal end 220 is physically and electrically coupled to the first wiring 103, shown in FIG. 1. A second coupling 216 is disposed at a third terminal end 204 of the extension 200. A fourth terminal end 222 of the extension is opposite the third terminal end 204. The first terminal end 202 of the universal musical instrument trainer 102 is configured to electrically couple to the third terminal end 204.

Each of the first and second couplings 214, 216 include a first signal pin 206, second signal pin 208, ground pin 210, and a power pin 212. The first and second couplings 214, 216 enable signals and instructions originating in the controller 116 to transmit and be received by the second LED array 218 in the extension 200. Accordingly, the signal pins 206, 208 transmit and receive signals from the controller 116, along the first and second wiring 103, 105 to the universal musical instrument trainer 102. The ground pin 210 is electrically coupled to an electrical ground, i.e. (not shown) of the controller 116. Similarly, the power pin 212 is electrically coupled to a power source of the controller 116.

One or more connectors 224 couple individual LEDs 106 to one another. The one or more connectors 224 coupling one or more wires 226 of one LED 106 to the one or more wires 226 of an adjacent LED 106. The wires 226 transmit and receive signals from each of the input panel 110 and controller 116 throughout the LED array 108.

Figure 3:
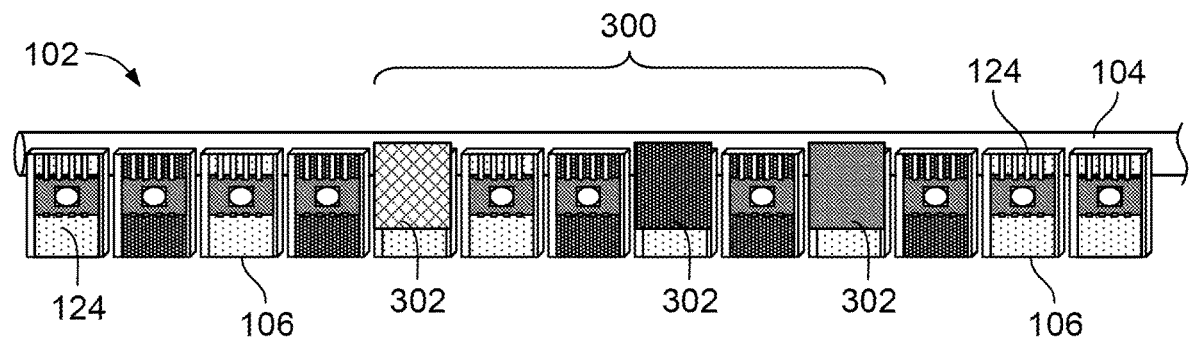
FIG. 3 is plan view of colored rings that are configured to wear by a user of the universal musical instrument trainer.
Figure 3:
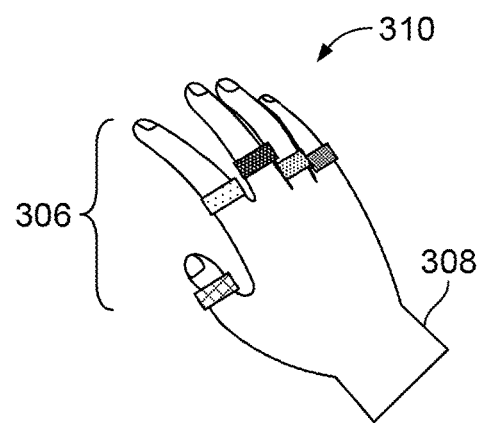

FIG. 3 is a plan view of colored rings 306 that are configured to wear by a user of the universal musical instrument trainer 102. In another implementation, the universal musical instrument trainer 102, each of the Plurality of colored LEDs 302 is configured to emit a color among a plurality of colors 300. Each one of the plurality of colored LEDs 302 is substantially similar to the LED 106, with the exception that each of the plurality of colored LEDs 302 can emit a colored light (e.g., a colored pulse). For example, each one of the plurality of colored LEDs 302 can produce a light having a color that is red, orange, yellow, green, blue. Although one of ordinary skill in the art would understand that additional colors can be emitted without departing from the scope of this disclosure.

Each one of the plurality of colored rings 306 can be disposed one of the fingers 310 of the hand 308 of the user (not shown). As noted above, one or more songs or musical notes are loaded into memory 120 of the controller 116. Each one of the plurality of colored LEDs 302 has a corresponding color in one of the colored rings 306. The color of one of the plurality of colored LEDs 306 indicates which finger 310, having a corresponding colored ring 306, should be played on the musical instrument (e.g., shown in FIGS. 6 and 7). For example, if the thumb of the user's hand 310 has a yellow ring 306, the middle finger had a red ring 306, and the little finger (i.e., pinky finger) has a blue ring 306, the plurality of colors 300 of the colored LEDs 302 will also include a corresponding yellow, red, and blue colored LED 302.

Continuing with the example, the controller 116 sends one or more signals to the LEDs 106 that includes a color at which the LED 106 should emit. As each finger 310 has a ring 306, the colored LED(s) 302 indicates which finger 310 should execute the note. Because the universal musical instrument trainer 102 is adjacent to a musical instrument, and each LED 106 corresponds to a given key or tone hole on an instrument, the colored LED 302 also indicates which finger 310 should play (i.e., strike) the given key or tone hole on the instrument.

A first set of the colored rings 306 can be different than a second set of colored rings (not shown). For example, the first set the colored rings can be red, orange, yellow, green, and blue. The second set of the colored rings 306 can be black, white, pink, gray, and purple. In this implementation, the first set of the colored rings 306 can be used on the right hand 308 of the user, and the second set of the colored rings 306 can be worn on the left hand 308 of the user. As such, signals from the controller 116 can be received at the plurality of colored rings 306, the signals indicating which of the colored LEDs 302 should be played by the left hand or the right hand.

Figure 4:
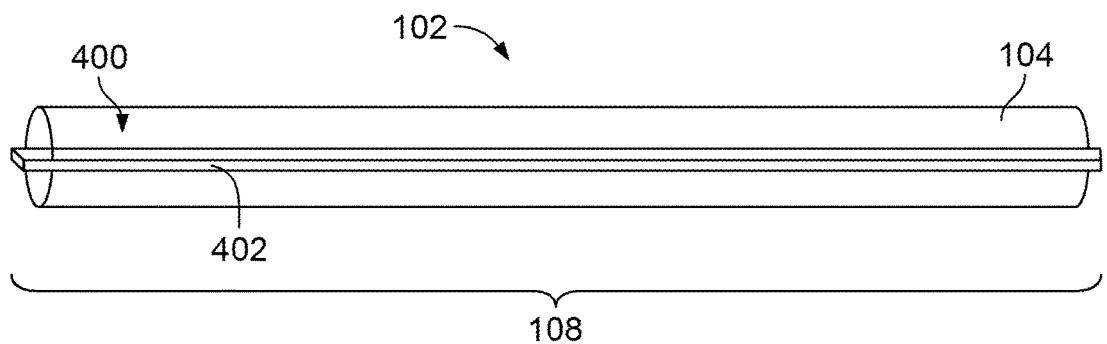
FIG. 4 is an isometric view of the universal musical instrument trainer having a receptacle channel configured to secure an array of light emitting diodes (LEDs).

FIG. 4 is an isometric view of the universal musical instrument trainer 102 having a receptacle channel 400 in the housing 104 configured to secure the First LED array 108. The receptacle channel 400 is configured to bias such that the receptacle channel 400 is substantially closed. In this manner, the receptacle channel 400 can detachably secure a securing member 402 therein.

As such, the securing member 402 is disposed in the receptacle channel 400 of the housing 104. In one example, the securing member 402 is a portion of the casing 124 (illustrated in FIG. 1), and therefore made from a same material. In another example, the securing member 402 is a rigid body that is affixed to the casing 124. As explained supra, the casing 124 encases wires 226 (see FIG. 2) that couple the LEDs 106 of the LED array 108. In addition, the casing 124 encases at least portion of each of the LEDs 106. As the rigid body, the securing member 402 can be a plastic or polymer, or metal. Securing member 402 is compressible along a direction orthogonal to the first LED array 108. As such, the receptacle channel 400 compresses the securing member 402 in a manner that mechanically secures the securing member 402 to the housing 104.

Figure 5A:
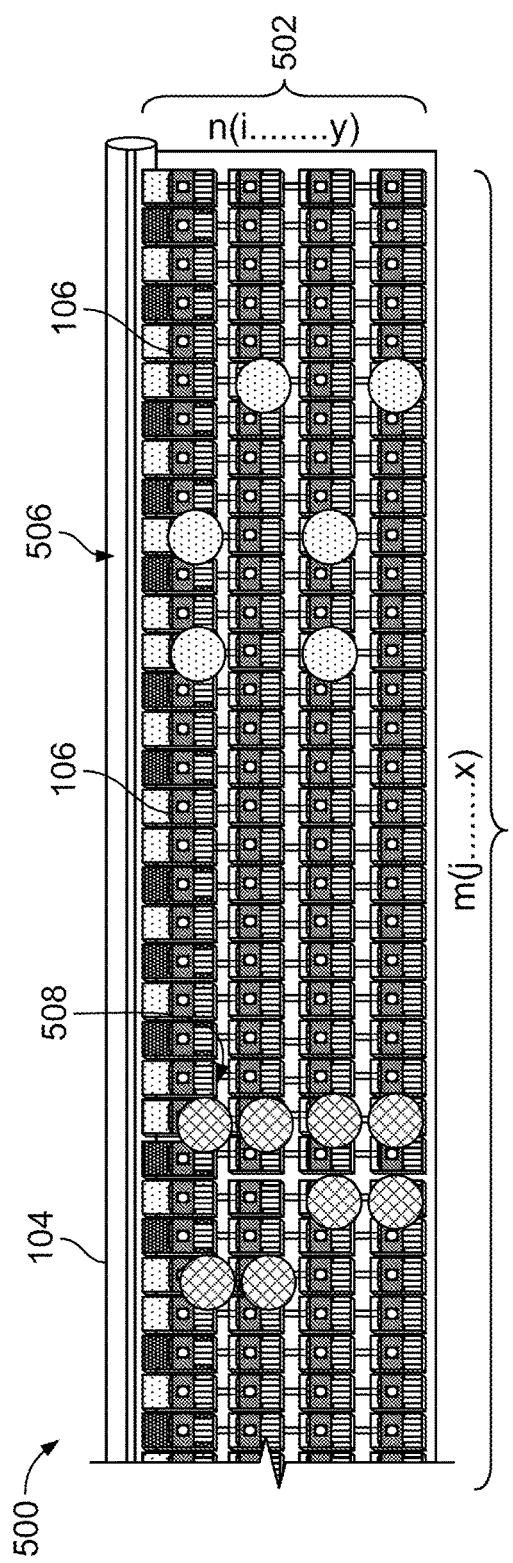
FIGS. 5A-5B illustrate alternate configurations of the universal musical instrument trainer shown in FIG. 1.
Figure 5B:
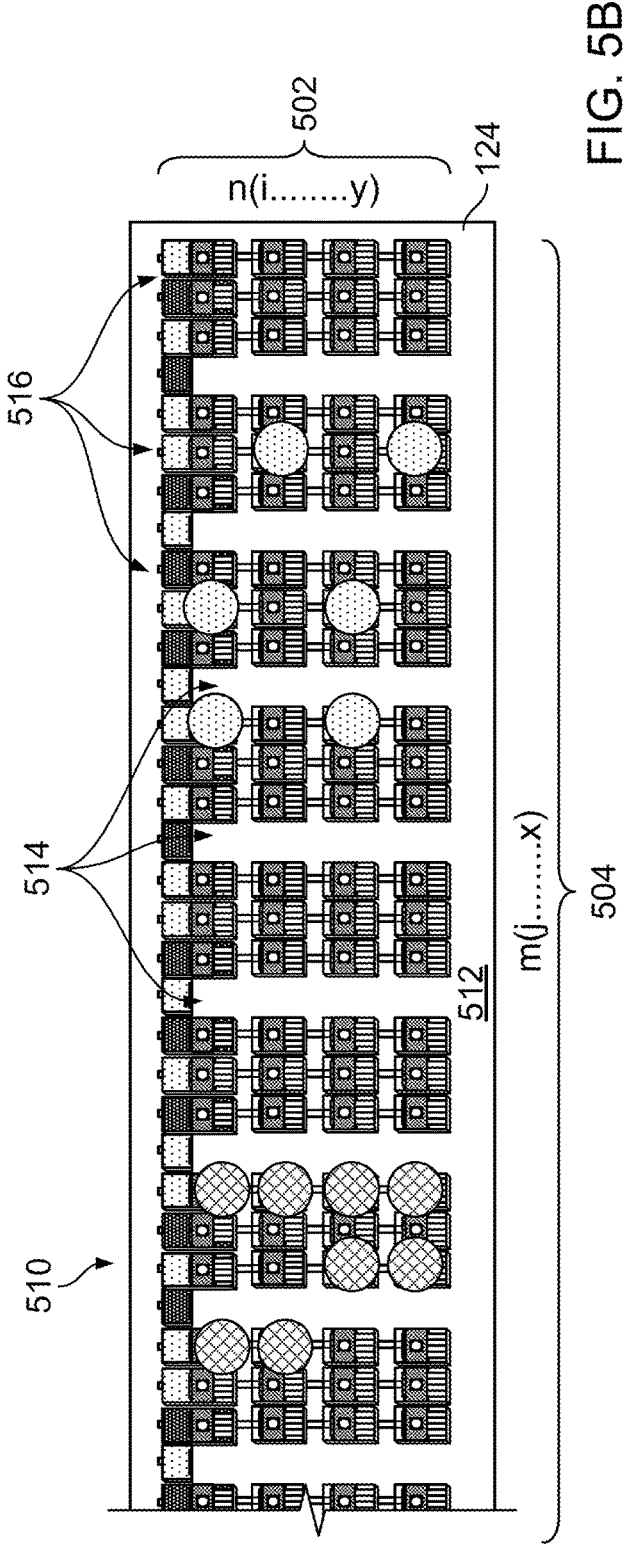

FIGS. 5A-5B illustrate alternate configurations of the universal musical instrument training system 100 shown in FIG. 1 that has a plurality of LEDs 106 disposed in rows (m) and columns (n). The multi-dimensional universal musical instrument trainer 500 includes a housing 104 to which rows (m) and columns (n) of LEDs 106 are attached. The multi-dimensional universal musical instrument trainer 500 is coupled to the input panel 110 and the controller 116, as described above.

The multi-dimensional universal musical instrument trainer 500 has a plurality of columns 502 $m$ (i) for the set of numbers from i to y, and a plurality of rows 504 $n$(j) for the set of numbers between j and x. In addition, the multi-dimensional universal musical instrument trainer 500 has fewer rows (n) than columns (m), where i and j can both an integer equal to 1 or greater.

The multi-dimensional universal musical instrument trainer 500 has substantially a same number of columns (m) as the first LED array 108, described above. As such, for m(j) . . . m(x), j is about 7 and x is about 90. Accordingly, there can be between about 7 LEDs 106 and about 90 LEDs 106. For n(i) . . . n(y) rows, i can be about 2 and y can be about 10. In some implementation, m(x) is about 66 or about 72 or about 88, and m(y) is about 4 or about 5.

Signals and instructions are received at the multi-dimensional universal musical instrument trainer 500 in a similar manner as described above with respect to the universal musical instrument trainer 102. However, a column position n(i), and the number of LEDs 106 illumined in a column (n) enable the visualization of an upcoming musical note, as well as, a duration of the musical note. Advantageously, a user can anticipate hand changes and musical note frequency changes.

In some implementations, the multi-dimensional universal musical instrument trainer 500 illuminate the LEDs 106 to indicate which musical notes should be played by the Right-hand color(s) 506, and which musical notes should be played by the Left-hand color(s) 508. For example, controller 116 can designate row n(i) of the multi-dimensional universal musical instrument trainer 500 as a beginning row, n(k) as a pending row, where i>k>y, and can designate row n(y) as a current row. A beginning row n(i) is a row that is closest to the housing 104. In this implementation, when an LED 106 is illuminated in the current row, n(y), the illumination indicates that a given musical note should be currently played on the musical instrument. A position, or key to be played, on the musical instrument is indicated by the column m.

An LED 106 illuminated at the beginning row n(i) and the pending row n(k) indicates a musical note to be played at a future time. As the number of the row n decreases, so decreases the period of delay at which the musical note is to be played. As such, the rows n closest to the current row n(y) are played before the rows furthest from the current row n(y). For example, where there are 4 rows in the multi-dimensional universal musical instrument trainer 500, n(1) is the current row to be played. Row n(2) is played at one time step behind the current row n(1). Row n(3) is played two time steps behind the current row n(1). And, row n(4) is played three time steps behind the current row n(1). Accordingly, the multi-dimensional universal musical instrument trainer 500 visualizes musical notes to be played over four time steps in a given song or scale. For each additional row n added to the multi-dimensional universal musical instrument trainer 500, a user is able to visualize a musical note to be played at an additional future time step.

In addition to the advantages enumerated above, the multi-dimensional universal musical instrument trainer 500 also enables the user to visualize the duration of the musical note. Continuing with the example of the four row n(4) multi-dimensional universal musical instrument trainer 500, the number of LEDs 106 illuminated in a given column indicates the number of time steps at which a musical note should be played. For example, a single illuminated LED 106 can indicates that the musical note should be played for one time step. Four illuminated LEDs 106 indicates that the musical note is to be played for four time steps. When in use, an illumination of the LEDs 106 in the multi-dimensional universal musical instrument trainer 500 will appear to cascade in sequence from the beginning row n(i) to the current row n(y), and the number of illuminated LEDs 106 in a row n corresponds to a length of time at which a given musical note should be played.

FIG. 5B illustrate another configuration of the universal musical instrument trainer 510. The multi-dimensional universal musical instrument trainer 510 has substantially similar features as the multi-dimensional universal musical instrument trainer 500. However, the LEDs 106 in the universal musical instrument trainer 510 are coupled together by the casing 124, forming a sheet 512. The sheet 512 can be substantially rectangular. Although the sheet 512 is illustrated in FIG. 5B as a continuous, it is understood that the sheet 512 can be segmented in order to accommodate different musical instruments.

The sheet 512 has a plurality of gaps 514 disposed in between segments 516. As illustrated, each gap 514 is about the thickness of one (1) column m, and each segment 516 includes about three (3) columns m, thus having a thickness of about 3 columns m. It can be appreciated that the gap 514 width and the segment 516 are not limited to the widths and lengths shown, and can be adapted without departing from the scope of this disclosure.

Figure 6:
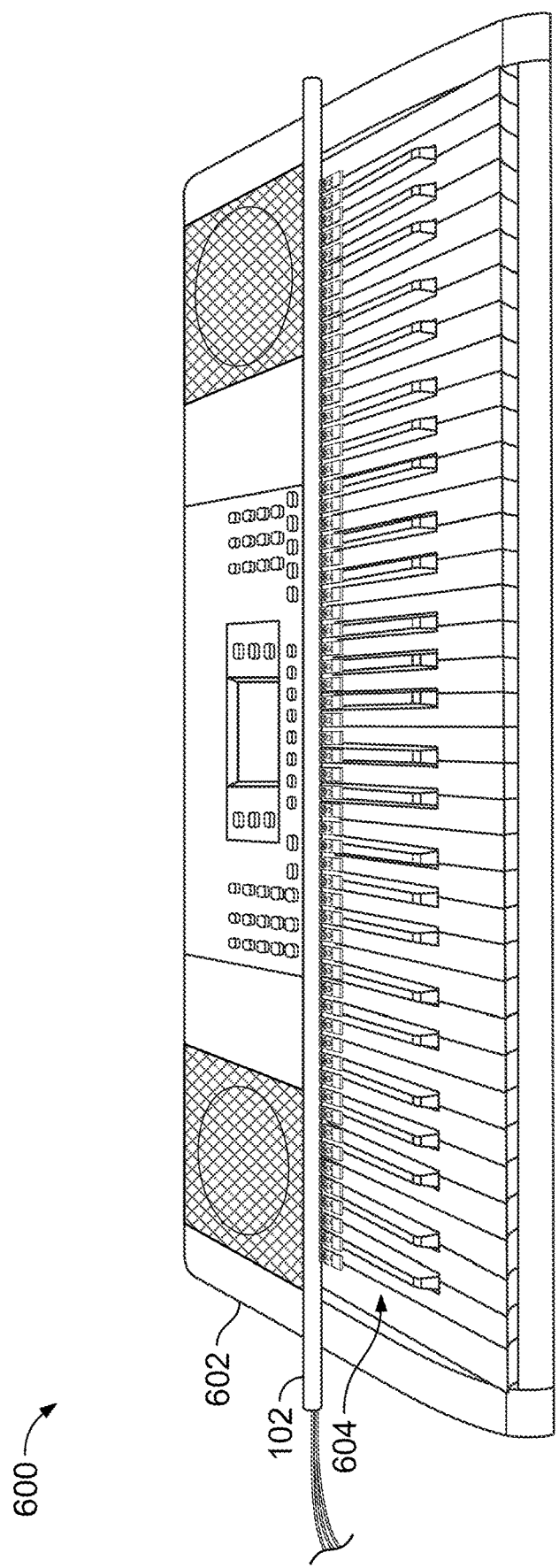
FIG. 6 is one depiction of the universal musical instrument trainer disposed on an instrument.

FIG. 6 is a depiction of the universal musical instrument trainer disposed on a keyboard instrument 600. The keyboard instrument 600 has a body 602 and a plurality of keys 604. The universal musical instrument trainer 102 is disposed lengthwise on the body 602 above the plurality of keys 604. It is to be appreciated that the arrangement in FIG. 6 illustrates one example among other examples of the universal musical instrument trainer, as shown in FIGS. 5A-5B, are similarly configured for use with the keyboard instrument.

The keyboard instrument 600 is an electronic keyboard, in the example shown. However, it is to be appreciated that the keyboard instrument can also be a so-called Chordophone, Aerophone, Idiophones, or an electrophone, including, but not limited to electric piano, acoustic piano, accordion, harmonium, harpsichord, clavichord, pipe organ, dulcitone, synthesizer, and the like.

Figure 7:
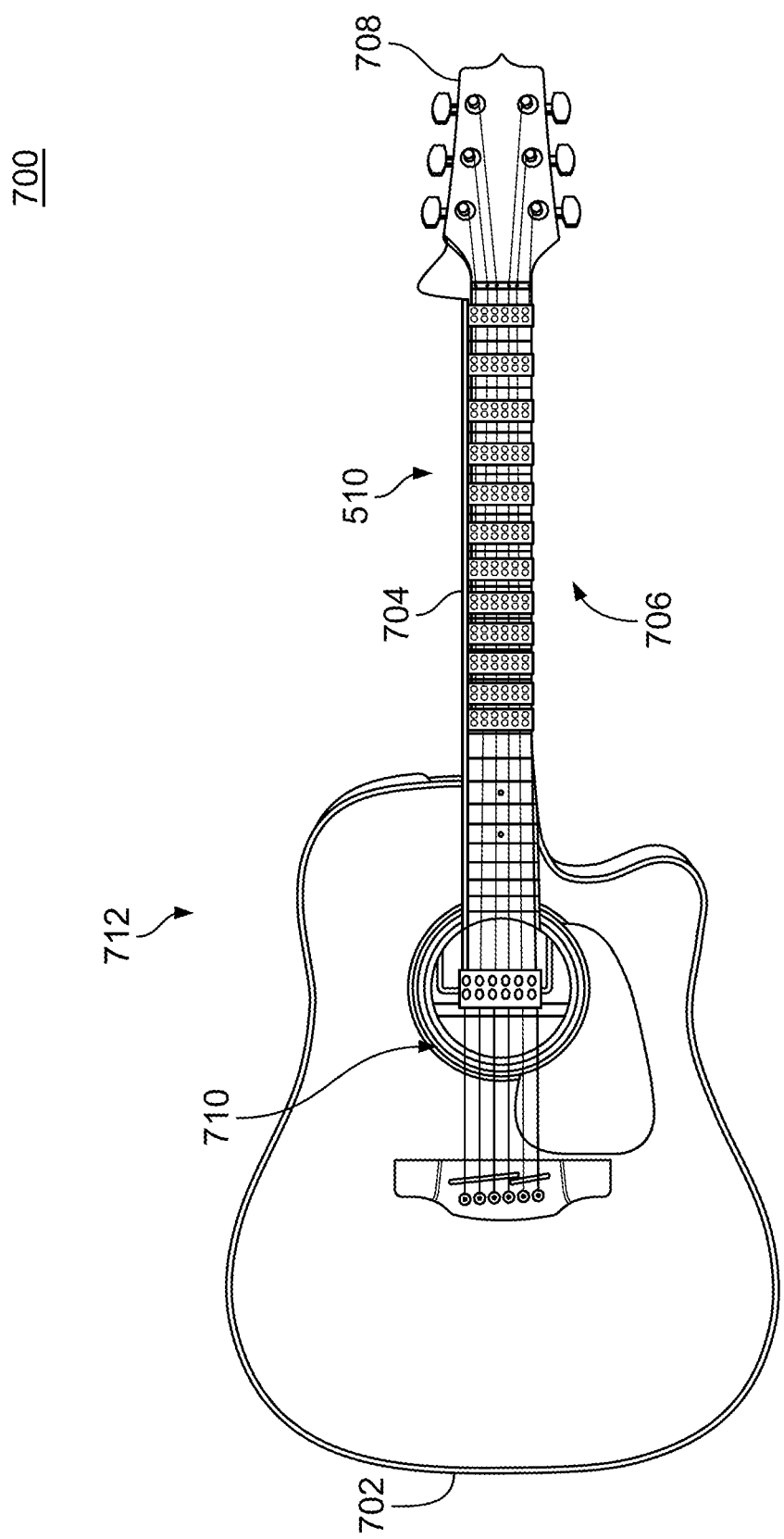
FIG. 7 is an alternate example of the universal musical instrument trainer disposed on a different instrument.

FIG. 7 shows an example of one of the universal musical instruments disclosed herein disponed a string instrument 712. The string instrument 712 shown includes a body 702, a neck 704 having a plurality of frets 706, a headstock 708, and a plurality of strings 710. In some implementations, the string instrument 712 has frets 706 on the neck that are useful for determining a position on the neck for correct notes. In other some implementations, the string instrument 712 does not have frets 706.

For example, the universal musical instrument trainer 510 is illustrated arranged upon the string instrument 712. The universal instrument trainer 510 is disposed on the neck 704 beneath the plurality of strings 710. The universal instrument trainer 510 has plural segments 516 having a space between adjacent segments 516, such that the segments 516 are arranged on the neck 704 without overlaying the frets 706.

In the example shown, one of the segments 516 of the universal musical instrument trainer 510 is placed beneath the strings 710 and between each of the frets 706 on the neck 704 of the string instrument 712. The frets 706 are disposed within the gaps 514 and the segments 516 are placed along the full length of the neck 704. In some implementations, the segment 516 can be placed below of the strings 710, as illustrated. The frequency, color, and number of LEDs 106 illuminated correspond to the musical notes to be played on the string instrument 712 and the keyboard instrument 600, as described in greater detail above.

The guitar shown in FIG. 7 is an example of a string instrument 712. Other string instruments 700 are contemplated, which can be any one of a class of string instruments including bowed, plucked, strummed, tapped, resonant, rubbed stringed instrument, including string instruments having keyboards. For example, the string instrument 712 can also include an electric or acoustic guitar, an electric bass, a violin, a viola, a cello, a double bass, a banjo, a mandolin, a ukulele, and a harp. As can be appreciated from the foregoing, the universal musical instrument trainer visualizes complex musical notation, thus enabling music to be played by a broader range of the public that is not proficient in reading sheet music. Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them.

A computer program code can be written in any form of programming language, including compiled or interpreted languages, or declarative or procedural languages; and it can be deployed on a system of one or more computers in any form, including as a stand-alone program, e.g., as an app, or as a module, component, engine, subroutine, or other unit suitable for executing in a computing environment, which environment may include one or more computers interconnected by a data communication network in one or more locations. The computer program code may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

For example, the program code can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively or in addition, the carrier may be an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The computer program code of the program product may conform to any one of a number of different programming languages. Illustrative computer-readable storage media include, but are not limited to: (i) non-writable storage media (e.g., read-only memory devices within a computer such as CD-ROM disks readable by a CD-ROM drive, flash memory, ROM chips, or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the methods described herein, are examples of the present disclosure.

The term "data processing apparatus" encompasses apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

To provide for interaction with a user, implementations of the subject matter described in this specification can be implemented on one or more computers having, or configured to communicate with, a display device, e.g., a LCD (liquid crystal display) or organic light-emitting diode (OLED) monitor, a virtual-reality (VR) or augmented-reality (AR) display, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback and responses provided to the user can be any form of sensory feedback, e.g., visual, auditory, speech or tactile; and input from the user can be received in any form, including acoustic, speech, or tactile input, including touch motion or gestures, or kinetic motion or gestures or orientation motion or gestures. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.). It is understood that the disclosure relates to options and securities trading and that several terms throughout the disclosure are industry terms that carry their plain meaning as understood by one of ordinary skill in the art of finance and securities/options trading. Such industry terms include, but are not limited to, benchmark, quoting currency, replication model, and settlement depository.

Additionally, if a specific number of an introduced claim recitation is intended, such an intent will be explicitly recited in the claim, and in the absence of such recitation no such intent is present. For example, as an aid to understanding, the following appended claims may contain usage of phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "about," "one or more," or "at least one," and indefinite articles such as "a" or "an" (e.g., "a" and/or "an" should be interpreted to mean "at least one" or "one or more"); the same holds true for the use of definite articles used to introduce claim recitations.

The use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements.

What is claimed is:

1. A universal musical instrument trainer, comprising:
a first array of light emitting diodes (LEDs), having a first plurality of LEDs coupled in series, and at least a first terminal end, wherein each LED of the first plurality of LEDs is surrounded by a casing;

a housing configured to extend wiring therethrough, the housing further comprising:
  a receptacle channel that is configured to attach to each casing of the first array of LEDs; and
a controller electrically coupled the first array of LEDs, the controller configured to:
  assign, to each one of the first plurality of LEDs in the first array of LEDs, a musical note selected from a plurality of musical notes; and
  generate one or more pulse signals that includes information corresponding to a duration and a frequency of each pulse of light to be displayed in one or more of the first plurality of LEDs.

2. The universal musical instrument trainer recited in claim 1, wherein the housing is configured to detachably mount to a surface of a musical instrument, wherein the musical instrument is a piano.

3. The universal musical instrument trainer recited in claim 2, wherein the one or more pulse signals correspond to musical notes is a musical scale or a song.

4. The universal musical instrument trainer recited in claim 2, wherein the housing is a cylindrical tube.

5. The universal musical instrument trainer recited in claim 2, wherein the plurality of LEDs are adjustable in a longitudinal direction.

6. The universal musical instrument trainer recited in claim 2, wherein the housing is adjustable along a longitudinal direction.

7. The universal musical instrument trainer recited in claim 1, wherein the controller is further configured to:
  assign, to each of one of the first plurality of LEDs, a color associated with each musical note; and
  generate, among the one or more pulse signals, a signal corresponding to a color of a pulse of light to be displayed, in response to receiving a control signal from a processor.

8. The universal musical instrument trainer recited in claim 1, further comprising:
  an extension configured to extend a length of the universal musical instrument trainer, the extension comprising:
    a second array of light emitting diodes (LEDs), having a second plurality of LEDs coupled in series, and at least a second terminal end; and
    a coupling disposed in the second terminal end, the coupling configured to electrically couple the first array of LEDs to the second array of LEDs.

9. The universal musical instrument trainer recited in claim 8, the coupling further comprising:
  a series of pins, including:
    at least one signal pin;
    a power pin; and
    a ground pin, wherein the series of pins in the second terminal end of the extension are configured to electrically couple to a corresponding series of pins in the first terminal end of the first array of LEDs.

10. The universal musical instrument trainer recited in claim 1, wherein a first color of a pulse of light corresponding to each musical note for playing by a left hand of a user is different that a second color of a pulse of light corresponding to each musical note for playing by a right hand of the user.

11. A universal musical instrument trainer for instruments with a keyboard, comprising:
  a first array of light emitting diodes (LEDs), having a first plurality of LEDs coupled in series, and at least a first terminal end, wherein each LED of the first plurality of LEDs is surrounded by a casing, the first array of LEDs further including: m number of rows and n number of columns, where m and n are positive integers, and n is greater than or equal to m;
  a housing configured to extend wiring therethrough, the housing further comprising:
    a receptacle channel that is configured to attach to each casing of to the first array of LEDs;
  a controller electrically coupled the first array of LEDs, the controller configured to:
    assign, to each one of the first plurality of LEDs in the first array of LEDs, a musical note selected from a plurality of musical notes; and
    generate one or more pulse signals that includes information corresponding to a duration and a frequency of each pulse of light to be displayed, in one or more of the first plurality of LEDs.

12. The universal musical instrument trainer recited in claim 11, wherein the controller is further configured to:
  assign, to each of one of the first plurality of LEDs, a color associated with each musical note; and
  generate, among the one or more pulse signals, a signal corresponding to a color of a pulse of light to be displayed, in response to receiving a control signal from a processor.

13. The universal musical instrument trainer recited in claim 12, wherein the controller is further configured to:
  generate, in two or more LEDs in a given row n, a simultaneous pulse for each LED for a predetermined period that corresponds to a length of time at which each musical note is to be played on a musical instrument.

14. The universal musical instrument trainer recited in claim 12, further comprising:
  a plurality of colored rings, each ring of the plurality of colored rings is wearable on a finger of a user of the universal musical instrument trainer.

15. The universal musical instrument trainer recited in claim 11, further comprising:
  an extension configured to extend a length of the universal musical instrument trainer, the extension comprising:
    a second array of light emitting diodes (LEDs), having a second plurality of LEDs coupled in series, and at least a second terminal end; and
    a coupling disposed in the second terminal end, the coupling configured to electrically couple the first array of LEDs to the second array of LEDs.

16. The universal musical instrument trainer recited in claim 15, the coupling further comprising:
  a series of pins, including:
    at least one signal pin;
    a power pin; and
    a ground pin, wherein the series of pins in the second terminal end of the extension are configured to electrically couple to a corresponding series of pins in the first terminal end of the first array of LEDs.

17. The universal musical instrument trainer recited in claim 11, wherein:
  a length of a pulse of light displayed in a given column n corresponds to a length of time at which each musical note is to be played on a musical instrument.

18. A system comprising:
  a first array of light emitting diodes (LEDs), having a first plurality of LEDs coupled in series, and at least a first terminal end, wherein each LED of the first plurality of LEDs is surrounded by a casing;

a housing configured to extend wiring therethrough, the housing further comprising:
  a receptacle channel configured to attach to each casing of the first array of LEDs;
a non-transitory computer readable medium storing instructions that, when executed by one or more processing devices coupled to a universal musical trainer, cause the one or more processing devices to perform operations comprising:
  assigning, to each one of the first plurality of LEDs in the first array of LEDs, a musical note selected from a plurality of musical notes; and
  generating one or more pulse signals that includes information corresponding to a duration and a frequency of each pulse of light to be displayed, in one or more of the first plurality of LEDs.

19. The system recited in claim 18, wherein the one or more pulse signals correspond to a musical scale or a song, and a first color of a pulse of light corresponding to each musical note for playing by a left hand of a user is different that a second color of a pulse of light corresponding to each musical note for playing by a right hand of the user.

20. A system comprising:
a first array of light emitting diodes (LEDs), having a first plurality of LEDs coupled in series, and at least a first terminal end, wherein each LED of the first plurality of LEDs is surrounded by a casing;
a housing configured to extend wiring therethrough, the housing further comprising:
  a receptacle channel that is configured to attach to each casing of the first array of LEDs; and
  a controller electrically coupled the first array of LEDs, the controller configured to:
    assign, to each one of the first plurality of LEDs in the first array of LEDs, a musical note selected from a plurality of musical notes;
    generate one or more pulse signals that includes information corresponding to a duration and a frequency of each pulse of light to be displayed in one or more of the first plurality of LEDs; and
a plurality of colored rings, each ring of the plurality of colored rings being wearable on a finger of a user of the system.

* * * * *